(12) United States Patent
Zhu et al.

(10) Patent No.: US 8,729,177 B2
(45) Date of Patent: May 20, 2014

(54) SILICONE GEL-FORMING COMPOSITIONS AND HYSTERETIC SILICONE GEL AND DEVICE COMPRISING THE GEL

(75) Inventors: Aijun Zhu, Garrett, IN (US); David Rene Lamb, Wheaton, IL (US)

(73) Assignee: Momentive Performance Materials Inc., Waterford, NY (US)

( * ) Notice: Subject to any disclaimer, the term of this patent is extended or adjusted under 35 U.S.C. 154(b) by 1594 days.

(21) Appl. No.: 13/122,039

(22) PCT Filed: Oct. 31, 2006

(86) PCT No.: PCT/US2006/042708
§ 371 (c)(1),
(2), (4) Date: Mar. 31, 2011

(87) PCT Pub. No.: WO2007/056026
PCT Pub. Date: May 18, 2007

(65) Prior Publication Data
US 2011/0251321 A1 Oct. 13, 2011

(51) Int. Cl.
*C08L 83/04* (2006.01)
*C08G 77/00* (2006.01)
(52) U.S. Cl.
USPC .............................. 524/588; 528/31; 528/32

(58) Field of Classification Search
None
See application file for complete search history.

(56) References Cited

U.S. PATENT DOCUMENTS

| 4,374,967 | A |  | 2/1983 | Brown et al. |
| 4,584,361 | A |  | 4/1986 | Janik et al. |
| 5,380,812 | A |  | 1/1995 | Lutz et al. |
| 5,711,072 | A | * | 1/1998 | Nakamura ............... 29/895.32 |
| 6,075,112 | A | * | 6/2000 | Irie et al. ..................... 528/15 |
| 6,518,204 | B2 | * | 2/2003 | Yamakawa et al. ........... 438/780 |
| 2002/0188059 | A1 | * | 12/2002 | Otomo ....................... 524/588 |
| 2005/0272893 | A1 | * | 12/2005 | Tanaka et al. ................ 528/15 |

FOREIGN PATENT DOCUMENTS

| EP | 0732373 |  | 9/1996 |
| EP | 1424364 |  | 6/2004 |
| EP | 1437382 |  | 7/2004 |
| EP | 1717274 |  | 11/2006 |
| JP | 2005-272061 |  | 10/1993 |
| JP | 2004204225 | A | 7/2004 |
| JP | 2004231824 | A | 8/2004 |

\* cited by examiner

*Primary Examiner* — Robert S Loewe
(74) *Attorney, Agent, or Firm* — Dominick G. Vicari; Joseph Waters

(57) ABSTRACT

There is provided silicone gel-forming composition comprising a unique combination of polyorganosiloxane and organohydrogenpolysiloxane, which can produce silicone gel with improved hysteresis.

23 Claims, No Drawings

SILICONE GEL-FORMING COMPOSITIONS AND HYSTERETIC SILICONE GEL AND DEVICE COMPRISING THE GEL

BACKGROUND OF THE INVENTION (1) Field of the Invention

The invention relates to silicone composition, process for making silicone composition and various end-use applications formed therefrom.

(2) Description of Related Art

Silicone gel, can be prepared using a variety of organosiloxane oligomers and polymers, and fillers. The choice of a particular combination of organosiloxane, and filler, and reaction conditions is governed at least in part, by the physical properties desired in the silicone gel. Particular end-use applications could benefit from an improved hysteretic silicone gel.

The formulations employed to prepare silicone gel range in viscosity from pourable liquids to non-flowable gums, which can be processed only under the high level of shear, achieved using a two- or three-roll rubber mill. Silicone gel currently can only be used in various hysteretic end-use applications as uncured silicone gel wrapped under a silicone rubber sleeve, and as a result the gel will leak out once the sleeve is broken. Alternatively, cured silicone gel currently available cannot achieve the desired hysteretic properties for various end-use applications.

The prior art discloses polyorganosiloxanes and fillers exhibiting various combinations of properties, however silicone gel exhibiting certain desirable hysteretic properties has not heretofore been provided for various desired end-use applications. This disclosure concerns hysteretic silicone gel exhibiting such desirable properties.

BRIEF DESCRIPTION OF THE INVENTION

In this brief description it is noted that the present inventors have unexpectedly discovered, in one specific embodiment, silicone gel-forming composition(s). This silicone gel-forming Composition comprises a unique combination(s) of hydride to vinyl ratio, crosslink density, and filler loading levels, which can produce silicone gel with improved hysteresis.

Thus in one embodiment, there is provided curable hysteretic silicone gel-forming composition comprising:

(A) at least one organopolysiloxane containing at least two silicon-bonded alkenyl groups per molecule;

(B) at least one organohydrogenpolysiloxane containing at least two silicon-bonded hydrogen atoms per molecule, said organohydrogenpolysiloxane (B) being used in an amount such that the mole ratio of total amount of silicon-bonded hydrogen atoms contained in organohydrogenpolysiloxane (B) to one silicon-bonded alkenyl group contained in organopolysiloxane (A) is of from about 0.20 to about 0.79;

(C) filler in an amount of from about 25 to about 100 parts per hundred of organopolysiloxane (A);

(D) catalyst; and, (E) inhibitor; wherein the recovery time of said curable hysteretic silicone gel-forming composition is greater than about 3 seconds.

DETAILED DESCRIPTION OF THE INVENTION

Applicants have discovered, in one embodiment, that improved hysteretic silicone gel-forming composition is obtained by using a specific mole ratio of total amount of silicon-bonded hydrogen atoms in organohydrogenpolysiloxane (B) to one silicon-bonded alkenyl group contained in polyorganosiloxane (A); combined with a specific filler loading level and providing for a specific recovery time.

As used herein the terms polyorganosiloxane and organopolysiloxane are interchangeable one with the other.

As used herein the terms organohydrogenpolysiloxane and polyorganohydrogensiloxane are used interchangeably with the other.

It will be understood herein that all uses of the term centistokes were measured at 25 degrees celsius.

It will be understood herein that all specific, more specific and most specific ranges recited herein comprise all sub-ranges therebetween.

It will be understood herein, unless stated otherwise, that all parts by weight are parts by weight based upon the total weight of organopolysiloxane (A).

It will be understood herein that hysteresis is a phenomenon in which the response of a physical system to an external influence depends not only on the present magnitude of that influence but also on the previous history of the system. Expressed mathematically, the response to the external influence is a doubled-valued function; one value applies when the influence is increasing, the other applies when the influence is decreasing. In the case of mechanical hysteresis, the response strain lags behind the stimuli stress. The hysteresis causes the loss of part of the elastic energy input in the form of heat. The more hysteretic the material, the more dead it feels, in contrast to an elastic rubbery response. In one embodiment herein, hysteresis can be expressed as a specific recovery time.

In one specific embodiment, organopolysiloxane (A) can be any known or commercially used organopolysiloxane with the proviso that organopolysiloxane (A) contains at least two silicon-bonded alkenyl groups per molecule.

In another specific embodiment, the organo group(s) of organopolysiloxanes (A) can be any organo group commonly associated with such polymers and can generally be selected from the non-limiting examples of alkyl radicals of 1 to about 8 carbon atoms, such as methyl, ethyl, propyl; cycloalkyl radicals such as cyclohexyl, cycloheptyl, cyclooctyl; mononuclear aryl radicals such as phenyl, methylphenyl, ethylphenyl; alkenyl radicals such as vinyl and allyl; and haloalkyl-radicals such as 3,3,3,trifluoropropyl. In a more specific embodiment, the organo groups are alkyl radicals of 1 to 8 carbon atoms, and are most specifically methyl. In yet another more specific embodiment, the organo groups comprise methyl and/or phenyl.

In one specific embodiment herein, organopolysiloxane (A) comprises the reaction product of linear polyorganosiloxane, branched polyorganosiloxane, and three-dimensional network polyorganosiloxane, provided that organopolysiloxane (A) contains at least two silicon-bonded alkenyl groups per molecule.

In one other specific embodiment herein polyorganosiloxane (A) can further comprise, in addition to polyorganosiloxane that independently contain at least two silicon-bonded alkenyl groups per molecule; non-alkenyl containing polyorganosiloxane selected from the group consisting of linear polyorganosiloxane, branched polyorganosiloxane, three-dimensional network polyorganosiloxane, resinous polyorganosiloxane and combinations thereof where each polyorganosiloxane does not contain any alkenyl groups. In one specific embodiment herein, the amount of polyorganosiloxane that does not contain any alkenyl groups as described above can be present in an amount of specifically less than about 5 weight percent based on the total weight of curable hysteretic silicone gel-forming composition described herein.

In one specific embodiment, linear polyorganosiloxane is defined as substantially straight chain polyorganosiloxane that can be terminated with triorganosiloxyl groups (M units) at molecular chain terminals and can have a molecular backbone chain consisting basically of the repetition of diorganosiloxane units (D units), and where M=$R^1R^2R^3SiO_{1/2}$ and D=$R^4R^5SiO_{1/2}$, where $R^1$, $R^2$, $R^3$, $R^4$, and $R^5$ are independently selected from the group consisting of a monovalent hydrocarbon radical of from one to about sixty carbon atoms; an unsaturated monovalent hydrocarbon radical containing from 2 to 10 carbon atoms; and combinations thereof, provided that linear polyorganosiloxane (A) contains at least two silicon-bonded alkenyl groups per molecule. In one embodiment, a substantially straight chain polyorganosiloxane as used herein is a polyorganosiloxane that comprises specifically less than about 30 weight percent, more specifically less than about 20 weight percent and most specifically less than about 10 weight percent of T and/or Q units, based on the weight of substantially straight chain polyorganosiloxane, where T=$R^6SiO_{3/2}$ and Q=$SiO_{4/2}$ where $R^6$ is selected from the group consisting of a monovalent hydrocarbon radical of from one to about sixty carbon atoms; an unsaturated monovalent hydrocarbon radical containing from 2 to 10 carbon atoms; and combinations thereof, provided that substantially straight chain polyorganosiloxane (A) contains at least two silicon-bonded alkenyl groups per molecule.

In another specific embodiment, branched polyorganosiloxane is defined as linear polyorganosiloxane with the proviso that the linear polyorganosiloxane comprises branched silicone chains which requires the polyorganosiloxane (A) to have some T and/or Q functionality, where T and Q are defined as above for substantially straight chain polyorganosiloxane, but not so much T and/or Q functionality that causes polyorganosiloxane (A) to form a three-dimensional network or that will adversely affect the recovery time as it is described herein and furthermore; branched polyorganosilxane (A) has to have excess D functionality along with some T and/or Q functionality to form branched silicone chains, where D is defined as above.

In another specific embodiment, three-dimensional network polyorganosiloxane is defined as the reaction product of M, D, T and Q units in any possible combination, where M, D, T and Q have the same definitions provided above, provided that three-dimensional network organopolysiloxane (A) contains at least two silicon-bonded alkenyl groups per molecule and comprises at least one D unit in combination with at least one T and/or Q unit, where T, D and Q are defined as above.

In one specific embodiment herein, polyorganosiloxane (A) can be substantially resinous polyorganosiloxane which has the general definition of three-dimensional network polyorganosiloxane (A) provided above and further comprises specifically, no less than about 30 weight percent, more specifically less than about 40 weight percent, and most specifically no less than about 50 weight percent of T and/or Q units, based upon the weight of substantially resinous polyorganosiloxane, with T and Q units being defined as described above, provided that polyorganosiloxane (A) contains at least two silicon-bonded alkenyl groups per molecule. In one specific embodiment substantially resinous polyorganosiloxane can comprise two or more substantially resinous polyorganosiloxanes provided that polyorganosiloxane (A) contains at least two silicon-bonded alkenyl groups per molecule.

In one specific embodiment, each organopolysiloxane (A) has a viscosity specifically of from about 10 to about 1,000,000, more specifically of from about 25 to about 500,000 and most specifically, of from about 50 to about 100,000 centipoise at 25 degrees celsius, and has the formula:

where
M=$R^7R^8R^9SiO_{1/2}$;
$M^{vi}$=$R^{10}R^{11}R^{12}SiO_{1/2}$;
D=$R^{13}R^{14}SiO_{2/2}$;
$D^{vi}$=$R^{15}R^{16}SiO_{2/2}$;
T=$R^{17}SiO_{3/2}$;
$T^{vi}$=$R^{18}SiO_{3/2}$; and
Q=$SiO_{2/2}$;

where $R^7$, $R^8$, $R^9$, $R^{13}$, $R^{14}$ and $R^{17}$ are independently monovalent hydrocarbon radicals having from one to sixty carbon atoms; $R^{10}$ is a monovalent unsaturated hydrocarbon radical having from two to ten carbon atoms, and $R^{11}$ and $R^{12}$ are independently monovalent hydrocarbon radicals having from one to sixty carbon atoms; $R^{15}$ is a monovalent unsaturated hydrocarbon radical having from two to ten carbon atoms and $R^{16}$ is a monovalent hydrocarbon radical having from one to sixty carbon atoms; $R^{17}$ is a monovalent unsaturated hydrocarbon radical having from two to ten carbon atoms; the stoichiometric subscripts a, b, c, d, e, f, and g are either zero or positive subject to the following limitations: c is greater than 10; d is from zero to about 40; when d=0, b=2; b is from zero to two, provided that when b=0, d=2; b+d is of from 2 to about 40, when b=1, a=1; a+b≥2; and in a substantially straight chain organopolysiloxane if e+f+g>0, then a+b+c+d≥e+f+g; and organopolysiloxane (A) contains at least two silicon-bonded alkenyl groups per molecule.

In one specific embodiment herein, polyorganosiloxane (A) can comprise a linear polyorganosiloxane as described above, where said linear polyorganosiloxane is at least one linear polyorganosiloxane selected from Table A below and M, $M^{vi}$, D, and $D^{vi}$ have the same unit definitions as provided above for formula $M_aM^{vi}_bD_cD^{vi}_dT_eT^{vi}_fQ_g$ and D(Ph) has the same definition as D provided that $R^{13}$ and/or $R^{14}$ comprises phenyl. It will be understood that percent vinyl is the weight percent of vinyl content based on the total weight of the specific organopolysiloxane.

TABLE A

| Formula | Viscosity (cps) | percent vinyl |
|---|---|---|
| polyorganosiloxane with vinyl on chain | 200 | 0.438 |
| $M^{vi}D_{100}M^{vi}$ | about 200 to about 300 | 0.62 |
| $M^{vi}D_{140}M^{vi}$ | about 500 to about 1000 | 0.34 |
| $MD_{160}M^{vi}$ | about 400 to about 700 | 0.195 |
| $M^{vi}D_{420}M^{vi}$ | 4,000 | 0.18 |
| $M^{vi}D_{800}M^{vi}$ | 40,000 | 0.08 |
| $M^{vi}D_{1100}M^{vi}$ | 80,000 | 0.06 |
| $MD_xD^{vi}_xM$; vinyl 0.176% | 10,000 | 0.176 |
| $M^{vi}D_{220}D(Ph)_{18}M^{vi}$ | 3,500 | 0.23 |
| $M^{vi}D_{160}D^{vi}_5M^{vi}$ | 500 | 1.65 |
| $M^{vi}D_{75}D^{vi}_{12}M^{vi}$ | 200 | 5.42 |
| $M^{vi}D_{560}D^{vi}_{36}M^{vi}$ | 4,000 | 2 |

In one specific embodiment herein, polyorganosiloxane (A) can comprise substantially resinous polyorganosiloxane as described above, where said substantially resinous polyorganosiloxane is at least one substantially resinous polyorganosiloxane selected from Table B below and M, $M^{vi}$, $D^{vi}$ and Q have the same unit definitions as provided above for formula $M_a M^{vi}{}_b D_e D^{vi}{}_d T_e T^{vi}{}_f Q_g$:

TABLE B

| Formula | Viscosity (cps) | Percent vinyl/percent of Resin in xylene (if in xylene) |
|---|---|---|
| $M_x D^{vi}{}_x Q_x$ | about 8 to about 13 | 2.5/60 |
| $M^{vi}{}_{3x} Q_x$ | about 15 to about 150 | 18.5 |
| $M_x Q_x D^{vi}{}_x$ | about 8 to about 15 | 2.5 |
| $M_x M^{vi}{}_x Q_x$ | about 10 to about 30 | 2.4/80 |
| $M_x M^{vi}{}_x Q_x$ | about 8 to about 15 | 2.4/60 |

In one specific embodiment, it will be understood that the at least two silicon-bonded alkenyl groups contained in polyorganosiloxane (A) can be located at a terminal location and/or between the terminal locations of polyorganosiloxane (A); provided that there are at least two silicon-bonded alkenyl groups contained in polyorganosiloxane (A). In another specific embodiment, an alkenyl group as used herein means a straight or branched chain alkenyl group containing from 2 to about 12 carbon atoms per group and at least one double bond between two carbon atoms per group. In a further specific embodiment, non-limiting examples of alkenyl groups include vinyl, propenyl, butenyl, pentenyl, hexeynl, heptenyl, octenyl, nonenyl, decenyl, undecenyl, dodeceynl and combinations thereof.

In one specific embodiment, compounds suitable as organopolysiloxane (A), which contain at least two silicon-bonded alkenyl groups per molecule, include, the non-limiting examples of vinyl-, propenyl-, and butenyl-containing polyorganosiloxanes, and combinations thereof.

In one embodiment, the at least two silicon-bonded alkenyl groups comprise from 1 to about 6 carbon atoms. In another embodiment, the at least two silicon-bonded alkenyl groups are vinyl.

In one embodiment herein organopolysiloxane (A) can comprise two or more of the same or different organopolysiloxanes as described herein.

In another embodiment, any combination of polyorganosiloxane (A) as described herein, can be used depending on the desired physical properties of the hysteretic silicone gel produced therefrom, provided that organopolysiloxane (A) contains at least two silicon-bonded alkenyl groups per molecule.

In one specific embodiment, organopolysiloxane (A) is used in an amount of specifically from about 50 to about 90 weight percent, more specifically of from about 60 to about 85 weight percent, and most specifically of from about 72 to about 82 weight percent based on the total weight of curable hysteretic silicone gel-forming composition.

In one specific embodiment herein, it will be understood that crosslink density is only one of the major factors controlling recovery time. As described herein, crosslink density, type of polyorganosiloxane (A) and orgnaohydrogenpolysiloxane (B) and filler loading level, as well as filler types: silica filler or non-silica filler, surface treated or non-surface treated, will all have effects on recovery time. In one specific embodiment, recovery time will decrease with increasing crosslink density; crosslink density has a limited effect by itself on recovery time; even when crosslink density is low so that the curable hysteretic silicone gel-forming composition or gel produced therefrom is soft, the recovery time is still unacceptably fast without sufficient filler loading; if one wants to rely on crosslink density alone and keeps decreasing crosslink density, one will eventually get into a weak gel zone, that it is more like an uncured material, and is weak and more analogous to a fluid and does not provide for a cured gel with desirable properties. In one specific embodiment herein there is provided a curable hysteretic silicone gel-forming composition as described herein with a recovery time of specifically greater than about 3 seconds, more specifically greater than about 10 seconds, and most specifically greater than about 60. In one specific embodiment, there is provided curable hysteretic silicone gel-forming composition with a low cross-link density that provides for the above-described recovery time ranges. In another specific embodiment a low cross link density can entail a ratio of (B) to (A) as described below. In yet a further specific embodiment a low cross-link density curable hysteretic silicone gel-forming composition can be provided in combination with a filler (C) type and amount of filler (C) as described herein.

In order to cross-link organopolysiloxane (A) and organohydrogenpolysiloxane (B) and form a two or three dimensional curable hysteretic silicone gel-forming composition as described herein, there needs to be at least two silicon bonded hydrogens on organohydrogenpolysiloxane (B) and at least two alkenyl groups on organopolysiloxane (A). It will also be understood that formation of cured hysteretic silicone gel formed herein comprises a two dimensional or three dimensional cross linked silicone polymer network that is the curable silicone gel-forming composition described herein.

In one specific embodiment organohydrogenpolysiloxane (B) can be any known or commercially used organohydrogenpolysiloxane with the provisos that organohydrogenpolysiloxane (B) contains at least two silicon-bonded hydrogen atoms per molecule. In one specific embodiment herein organohydrogenpolysiloxane (B) is substantially free of aliphatic unsaturation.

In one specific embodiment, each organohydrogenpolysiloxane (B) has a viscosity of specifically from about 0.1 to about 2000, more specifically of from about 0.5 to about 1000 and most specifically of from about 1 to about 500 centipoise at 25 degrees celsius.

In another specific embodiment, the organo group of organohydrogenpolysiloxane (B) can be any organo group such as those described above for organopolysiloxane (A). In yet another more specific embodiment, the organo groups of organohydrogenpolysiloxane (B) comprise a methyl and/or phenyl.

In one specific embodiment herein, organohydrogenpolysiloxane (B) comprises the reaction product of linear organohydrogenpolysiloxane, branched organohydrogenpolysiloxane, cyclic organohydrogenpolysiloxane and three-dimensional network organohydrogenpolysiloxane provided that organohydrogenpolysiloxane (B) contains at least two silicon-bonded hydrogen atoms per molecule.

In one other specific embodiment herein organohydrogenpolysiloxane (B) can further comprise, in addition to organohydrogenpolysiloxane (B) that independently contain at least two silicon-bonded hydrogen atoms per molecule; non-hydrogen containing organohydrogenpolysiloxane selected from the group consisting of linear organohydrogenpolysiloxane, branched organohydrogenpolysiloxane, cyclic organohydrogenpolysiloxane, three-dimensional network organohydrogenpolysiloxane, resinous organohydrogenpolysiloxane and combinations thereof where each organohydrogenpolysiloxane does not contain any silicon-bonded hydrogen atoms.

In one specific embodiment, linear organohydrogenpolysiloxane is defined as a substantially straight chain organohydrogenpolysiloxane that can be terminated with M units at molecular chain terminals and having a molecular backbone chain consisting basically of the repetition of D units where $M=R^{19}R^{20}R^{21}SiO_{1/2}$ and $D=R^{22}R^{23}SiO_{1/2}$, where $R^{19}$, $R^{20}$, $R^{21}$, $R^{22}$ and $R^{23}$ are independently selected from the group consisting of a monovalent hydrocarbon radical of from one to about sixty carbon atoms; a hydrogen atom; and combinations thereof, provided that organohydrogenpolysiloxane (B) contains at least two silicon-bonded hydrogen atoms per molecule. A substantially straight chain organohydrogenpolysiloxane as used herein is an organohydrogenpolysiloxane that comprises specifically less than about 30 weight percent, more specifically less than about 20 weight percent, and most specifically less than about 10 weight percent of T and/or Q units, based upon the weight of substantially straight chain organohydrogenpolysiloxane, where $T=R^{24}SiO_{3/2}$ and $Q=SiO_{4/2}$, where $R^{24}$ is selected from the group consisting of a monovalent hydrocarbon radical of from one to about sixty carbon atoms; a hydrogen atom; and combinations thereof, provided that substantially straight chain organohydrogenpolysiloxane (B) contains at least two silicon-bonded hydrogen atoms per molecule.

In another specific embodiment, branched organohydrogenpolysiloxane is defined as linear organohydrogenpolysiloxane with the proviso that the linear organohydrogenpolysiloxane comprises branched silicone chains which requires the organohydrogenpolysiloxane (B) to have some T and/or Q functionality, where T and/or Q is defined as above for linear organohydrogenpolysiloxane, but not sufficient T and/or Q-functionality for organohydrogenpolysiloxane (B) to form a three-dimensional network or that will adversely affect recovery time as it is described herein; and furthermore, branched organohydrogenpolysiloxane (B) has to have excess D functionality along with some T and/or Q functionality to form branched silicone chains, where D is defined as above for linear organohydrogenpolysiloxane.

In another specific embodiment, cyclic organohydrogenpolysiloxane is defined as a cyclic structure comprising of from about 3 to about 10 silicon atoms and more specifically of from about 3 to about 6 silicon atoms, more specifically still, cyclic organohydrogenpolysiloxane has the formula selected from the group consisting of $D_3$, $D_4$ $D_5$, and $D_6$ where $D=R^{25}R^{26}SiO_{1/2}$ where $R^{25}$ and $R^{26}$ are independently monovalent hydrocarbon radicals having from one to about sixty carbon atoms provided that cyclic organohydrogenpolysiloxane (B) contains at least two silicon-bonded hydrogen atoms per molecule.

In another specific embodiment, three-dimensional network organohydrogenpolysiloxane is defined as the reaction product of M, D, T and Q units in any possible combination, where M, D, T and Q have the same definitions provided above for linear organohydrogenpolysiloxane (B), provided that three-dimensional network organohydrogenpolysiloxane (B) contains at least two silicon-bonded hydrogen atoms per molecule and comprises at least one D unit in combination with at least one T and/or Q unit, where T, D and Q are defined as above for linear organohydrogenpolysiloxane (B).

In one specific embodiment, organohydrogenpolysiloxane (B) can be substantially resinous organohydrogenpolysiloxane which has the general definition of three-dimensional network organohydrogenpolysiloxane (B) provided above and further comprises specifically, no less than about 30 weight percent, more specifically, no less than about 40 weight percent, and most specifically no less than about 50 weight percent of T and/or Q units, based upon the weight of substantially resinous organohydrogenpolysiloxane, with T and Q units being defined as described above for linear organohydrogenpolysiloxane (B), provided that substantially resinous organohydrogenpolysiloxane (B) contains at least two silicon-bonded hydrogen atoms per molecule.

In one specific embodiment, there is provided a curable hysteretic silicone gel-forming composition where each organohydrogenpolysiloxane (B) has the formula:

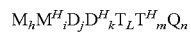

$$M_h M^H_i D_j D^H_k T_L T^H_m Q_n$$

where

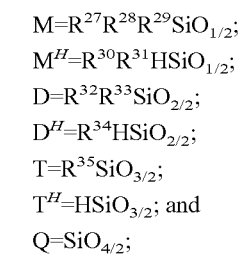

$M=R^{27}R^{28}R^{29}SiO_{1/2}$;

$M^H=R^{30}R^{31}HSiO_{1/2}$;

$D=R^{32}R^{33}SiO_{2/2}$;

$D^H=R^{34}HSiO_{2/2}$;

$T=R^{35}SiO_{3/2}$;

$T^H=HSiO_{3/2}$; and $Q=SiO_{4/2}$;

where $R^{27}$, $R^{28}$, $R^{29}$, $R^{32}$, $R^{33}$, and $R^{35}$ are independently monovalent hydrocarbon radicals having from one to sixty carbon atoms and are substantially free of aliphatic unsaturation; $R^{30}$, $R^{31}$, and $R^{34}$ are independently monovalent hydrocarbon radicals having from one to sixty carbon atoms or hydrogen and are substantially free of aliphatic unsaturation the stoichiometric subscripts h, i, j, k, L, m and n being zero or positive subject to the following limitations: J is greater than 0; k is of from zero to about 20, when k=0, i=2; h is of from zero to about 2; subject to the further limitation that i+k is of from 2 to about 20, when i=1, h=1; h+i≥2; and in at least one substantially straight chain organohydrogenpolysiloxane if L+m+n>0 then h+i+j+k>L+m+n; and organohydrogenpolysiloxane (B) contains at least two silicon-bonded hydrogen atoms per molecule.

In one specific embodiment herein, organohydrogenpolysiloxane (B) can comprise a linear organohydrogenpolysiloxane as described above, where said linear organohydrogenpolysiloxane is at least one linear organohydrogenpolysiloxane selected from Table C below and M, $M^H$, D, and $D^H$ have the same unit definitions as provided above for formula $M_h M^H_i D_j D^H_k T_L T^H_m Q_n$. It will be understood that weight percent hydride is based on the weight of the specific organohydrogenpolysiloxane.

TABLE C

| Formula | Viscosity (cps) | weight percent hydride |
|---|---|---|
| $M^H D_3 M^H$ | 2 | 0.52 |
| $M^H D_6 M^H$ | 2 | 0.346 |
| $M^H D_{25} M^H$ | 25 | 0.11 |
| $M^H D_{50} M^H$ | 50 | 0.055 |
| $M^H D_{50} D^H_{50} M^H$ | 50 | 0.86 |
| $M^H D_{100} D^H_{22} M^H$ | 100 | 0.23 |
| $MD^H_4 M$ | 1.5 | 0.098 |
| $MD_{20} D^H_{10} M$ | 30 | 0.4 |
| $MD_{20} D^H_{20} M$ | 30 | 0.74 |
| $MD^H_{20} M$ | 25 | 1.65 |

In another specific embodiment herein, organohydrogenpolysiloxane (B) can comprise a substantially resinous organohydrogenpolysiloxane as described above, where said substantially resinous organohydrogenpolysiloxane is at least one resinous organohydrogenpolysiloxane selected from Table D below and M, $M^H$, T and Q have the same unit definitions as provided above for formula $M_h M^H_i D_j D^H_k T_L T^H_m Q_n$:

TABLE D

| Formula | Viscosity (cps) | weight percent hydride |
|---|---|---|
| $M^H_3M_{12}T_{10}Q_{10}$ | about 40 to about 200 | 700 ppm |
| $M^H_{2x}Q_x$ | about 10 to about 26 | 0.9 |

In yet another specific embodiment, it will be understood that at least two silicon-bonded hydrogen atoms per molecule contained in organohydrogenpolysiloxane (B) can be located at a terminal location and/or between the terminal locations of organohydrogenpolysiloxane (B); provided that there are at least two silicon-bonded hydrogen atoms per molecule in organohydrogenpolysiloxane (B).

In one embodiment herein organohydrogenpolysiloxane (B) can comprise two or more of the same or different organohydrogenpolysiloxanes as described herein.

In one specific embodiment, any combination of organohydrogenpolysiloxane (B) can be used depending on the desired physical properties of the polymerized hysteretic silicone gel produced therefrom, provided that organohydrogenpolysiloxane (B) contains at least two silicon-bonded hydrogen atoms per molecule.

In one other specific embodiment, organopolysiloxane (A) and organohydrogenpolysiloxane (B) are used in amounts that will provide desirable curable hysteretic silicone gel-forming composition and/or desirable curable hysteretic silicone gel.

In one specific embodiment, said organohydrogenpolysiloxane (B) is used in an amount such that the mole ratio of total amount of silicon-bonded hydrogen atoms contained in organohydrogenpolysiloxane (B) to one silicon-bonded alkenyl group contained in organopolysiloxane (A) is specifically of from about 0.2 to about 0.79, more specifically of from about 0.25 to about 0.75 and even more specifically of from about 0.30 to about 0.65, yet even more specifically of from about 0.35 to about 0.60 and most specifically of from about 0.40 to about 0.55. In one other specific embodiment, said organohydrogenpolysiloxane (B) is used in an amount such that the mole ratio of total amount of silicon-bonded hydrogen atoms contained in organohydrogenpolysiloxane (B) to one silicon-bonded alkenyl group contained in organopolysiloxane (A) is specifically of from about 0.20 to about 0.49, and more specifically of from about 0.25 to about 0.45, even more specifically of from about 0.30 to about 0.40 and most specifically of from about 0.32 to about 0.36.

In another specific embodiment, the phrase "total amount of silicon-bonded hydrogen atoms" as used herein refers to the mathematical sum of all of the occurrences of a Si—H bond in organohydrogenpolysiloxane (B).

In one specific embodiment, organohydrogenpolysiloxane (B) is used in an amount of specifically of from about 0.05 to about 10 weight percent, more specifically of from about 0.1 to about 5 weight percent and most specifically of from about 0.2 to about 2 weight percent of organohydrogenpolysiloxane (B) based on the total weight of the curable hysteretic silicone gel-forming composition.

In one specific embodiment, the choice of organohydrogenpolysiloxane (B) has a direct relationship with recovery time, in that, as stated above, lower crosslink density is needed for longer recovery time; however, it can only be realized with proper amount of filler, too little filler does not provide a curable silicone gel, too much will excessively harden the material and the more reinforcing (smaller) the filler is, the less filler is needed for a certain recovery time.

In another specific embodiment, filler (C) can be known or commercially used filler. In yet a further specific embodiment, filler (C) is a component that is usually used in silicone rubber or any other rubbers to import physical and mechanical strength to cured silicone rubber. In one embodiment, filler (C) can be any of the non-limiting examples selected from the group consisting of where filler is selected from the group consisting of silica, fumed silica, precipitated silica, titania, alumina, clay, wollastonite quartz, and combinations thereof. In one specific embodiment, fumed silica, and carbon black are non-limiting examples of reinforcing filler. In another specific embodiment herein, there are provided semi-reinforcing fillers, such as the non-limiting examples of precipitated silica, treated clay and treated wollastonite. In another specific embodiment herein, silica, titania, alumina, clay, and quartz are some non-limiting examples of extending fillers. In one specific embodiment, fumed silica as used herein can be commercially available fumed silica.

In one embodiment herein, filler (C) is provided in an amount that imparts a desired physical strength. In one specific embodiment, filler (C) is present in an amount specifically of from about 10 to about 50 weight percent, more specifically of from about 15 to about 40 weight percent, and most specifically of from about 16 to about 30 weight percent based on the total weight of the curable hysteretic silicone gel-forming composition. In one specific embodiment, the more reinforcing the filler is the longer the recovery time will be.

In one other embodiment herein, filler (C) can be used in an amount of specifically from about 11 to about 100 parts based on 100 parts of polyorganosiloxane (A), more specifically from about 20 to about 70 parts based on 100 parts of polyorganosiloxane (A), and most specifically from about 22 to about 43 parts based on 100 parts of polyorganosiloxane (A In one specific embodiment herein there is provided filler (C) that can comprise two or more fillers that are different and further where those fillers can be either treated or untreated.

In one specific embodiment herein, recovery time of hysteretic silicone gel is advantageously lengthened by using the amounts of filler (C) as described above. In another embodiment, recovery time of hysteretic silicone gel is advantageously lengthened by using partially treated silica as the filler.

In one specific embodiment herein, filler can have a surface area specifically of from about 30 microns to about 400 m²/g more specifically of from about 5 microns to about 300 m²/g and most specifically of from about 50 m²/g to about 200 m²/g. In another specific embodiment, filler can have a particle size (average diameter) of about 5 nanometers (nm) to about 200 nanometers, more specifically, of from about 7 nm to about 100 nm and most specifically about 10 nm to about 50 nm.

In one specific embodiment herein, surface treated filler and untreated filler would both have a positive effect on recovery time, but it might be minimal due to the nature of the gel and untreated filler would provide for a different recovery time than treated filler.

In yet another specific embodiment, catalyst (D) can be any known or commercially used catalyst that will accelerate the curing caused by the addition reaction of polyorganosiloxane (A) with organohydrogenpolysiloxane (B). In one specific embodiment, catalyst (D) is at least one Group VIII B catalyst. In one other specific embodiment, catalyst (D) is a platinum catalyst. In yet a further embodiment, non-limiting examples of platinum catalysts include platinum black, chloroplatinic acid, alcohol-modified products of chloroplatinic acid, and complexes of chloroplatinic acid with olefins, aldehydes, vinylsiloxanes or acetylene alcohols and combinations thereof. In another specific embodiment, catalyst (D) is a palladium catalyst with non-limiting examples such as tetrakis(triphenylphosphine)palladium. In yet another specific embodiment, catalyst (D) is a rhodium catalyst with non-limiting examples such as rhodium-olefin complexes and chlorotris(triphenylphosphine)rhodium. In one embodiment, catalyst (D) can be added in what is called a catalytically-effective quantity, which can appropriately be made large or small in accordance with the desired curing rate. In one specific embodiment, catalyst (D) can be used specifically in an amount ranging of from about 3 ppm to about 30 ppm, more specifically of from about 5 to about 20 ppm, and most specifically of from about 10 to about 15 ppm. In one embodiment the amount of catalyst (d) is the total amount of platinum metal present in the curable hysteretic silicone gel-forming composition described herein.

In one specific embodiment herein there is provided catalyst (D) that can comprise two or more catalysts that are different.

In yet still another specific embodiment, inhibitor (E) can be any known or commercially used inhibitor that will adequately control curing time of components (A), (B), (C) and (D) and allow the curable hysteretic silicone gel-forming composition to be put to practical use. In one specific embodiment inhibitor (E) can contain aliphatic unsaturation. In another specific embodiment, inhibitor (E) can have no aliphatic unsaturation. In yet a further embodiment, non-limiting examples of inhibitor (E) are selected from the group consisting of diallyl maleate, D-4 vinyl, 2-methyl-3-butene-2-ol, 1-ethynyl-1-cyclohexanol, 3,5,-dimethyl-1-hexyn-3-ol and combinations thereof. In one specific embodiment, inhibitor (E) is used in an amount specifically of from about 0.02 to about 1 weight percent, more specifically of from about 0.05 to about 0.5 weight percent and most specifically of from about 0.1 to about 0.2 weight percent based on the total weight of the curable hysteretic silicone gel-forming composition. In one specific embodiment inhibitor (E) can be present in any amount to provide for a range of curing temperatures and times, specifically a curing time anywhere from about 10 seconds at about 177 degrees celsius to about 24 hours at room temperature.

In one specific embodiment herein there is provided inhibitor (E) that can comprise two or more inhibitors that are different.

In one specific embodiment herein there is provided curable hysteretic silicone gel-forming composition comprising the specific formulation where organopolysiloxane (A) is a combination of (A-i) vinyl organopolysiloxane having a viscosity of from about 20,000 to about 60,000 centipoise at 25 degrees celsius, being present in an amount of from about 60 to about 75 weight percent, and (A-ii) vinyl organopolysiloxane having a viscosity of from about 250 to about 750 centipoise at 25 degrees celsius being present in an amount of from about 5 to about 15 weight percent; organohydrogenpolysiloxane (B) is at least one organohydrogenpolysiloxane that has terminal group silicon-bonded hydrogen atom and/or additional silicon-bonded hydrogen atom beyond terminal group silicon-bonded hydrogen atom per molecule and having a viscosity of from about 15 to about 60 centipoise at 25 degrees celsius, being present in an amount of from about 0.2 to about 0.5 weight percent; filler (C) being fumed silica with a surface area of from about 200 to about 350 m$^2$/g, said fumed silica having been treated with silane, where filler (C) is present in an amount of from about 15 to about 25 weight percent; catalyst (D) is a platinum catalyst where catalyst (D) is present in an amount of from about 10 ppm to about 20 ppm; and, inhibitor (E) is 1-ethynyl-1-cyclohexanol where inhibitor (E) is present in an amount of from about 0.05 to about 0.1 weight percent, with all weight percents being based upon the total weight of the curable hysteretic silicone gel-forming composition.

In one embodiment herein, the components (A)-(E) can be combined in a conventional processes as are known to those skilled in the art. In one embodiment components (A)-(E) described herein can be combined in one reaction vessel. In an alternative embodiment components (A)-(E) can be separately mixed into a two mixture process and then the two mixtures can be combined prior to heating and curing of the combined mixtures.

In another specific embodiment, there is provided herein hysteretic silicone gel obtained from the curing of curable hysteretic silicone gel-forming composition described herein.

In one specific embodiment, it will be understood herein that the curing (or crosslinking) of curable hysteretic silicone gel-forming composition can be conducted through a method selected from the group consisting of addition curing, condensation curing, and combinations thereof.

In one specific embodiment herein, the recovery time, as defined above, can vary depending on cured hysteretic gel that is formed from curable hysteretic silicone gel-forming composition; as well as the application to which it is applied. In one specific embodiment herein there is provided cured hysteretic gel having a recovery time of specifically greater than about 3 seconds, more specifically greater than about 10 seconds and most specifically greater than about 60 seconds.

In another specific embodiment, the hysteretic silicone gel can provide a cushioning element that can be used in various end-use applications. In one specific embodiment, cushioning element can be used in a hand-grippable device having an external surface at least a portion of which comprises cured hysteretic silicone gel obtained from the polymerization of the curable hysteretic silicone gel-forming composition herein. In one further embodiment, external surface at least a portion of which comprises hysteretic silicone gel can be used to provide cushioning effect, such as a comfortable grip or shock absorption. In another specific embodiment, the area, size, and thickness of external surface can be determined according to the specific application of the cushioning element.

In one specific embodiment, the cushioning element herein is intended to be used with an article to provide a cushioning effect upon gripping the cushioning element on the article.

In one specific embodiment, hand-grippable device is a writing implement, a razor, a toothbrush, a utensil, sport equipment, a tool, a motor-driven device, or a steering wheel.

In a further embodiment the hand-grippable device is a writing implement where the writing implement is a pen.

The examples below are given for the purpose of illustrating the invention of the instant case. They are not being given for any purpose of setting limitations on the embodiments described herein. All weights are weight percent based on the weight of the entire curable hysteretic silicone-gel forming composition, unless stated otherwise.

EXAMPLES

The examples below were made by combining all of the provided component in one reaction vessel.

Sample preparation: A hysteretic silicone gel material as described herein was molded into cured buttons each with a thickness of about 28.575 millimeters (mm) and a diameter of about 28.575 mm. Typical molding conditions were at 176.6 degrees celsius for a period of 17 minutes.

Deformation: In general, any type of strain can be applied, including tension, compression, or even distortion. For convenience, we used a hard rod with a blunt rod tip with a diameter of about 0.635 centimeters to press the center of one flat surface of each of the above buttons, whose opposing flat surface was placed against a hard substrate, until an indentation of about 1.27 centimeters was reached.

Recovery time: Once the desired indentation was made, the compression stress was released. A thin soft Mylar sheet can be used on top of the gel to help release the 0.635 centimeter probing rod. Also, depending on the application, a skin (housing) material was used to test the recovery time in the application's environment, as is shown below. The recovery time was measured from the moment when the stress was released to the moment the button recovered 100 percent of its original shape, as per visual inspection. In one specific embodiment herein when a skin material is used the recovery time of the curable hysteretic silicone gel-forming composition can be faster than when said skin material is not present. In one specific embodiment curable hysteretic silicone gel-forming composition can be used with or without a skin material.

The data in table 1 below was tested with a skin material, which is a thin layer of injection molded liquid silicone rubber material. The gel responded faster due to the elasticity of the skin material, so the response time was longer (in the minutes range, such as is seen for the formulations in examples 11-13.) when used without any skin material, or the skin material was really soft and thin, therefore had no/little elastic contributions to the material's response. In one embodiment herein, skin material can comprise any known or conventionally used skin material, and can further comprise any plastic material that will provide housing for the hysteretic silicone gel obtained from the curing of curable hysteretic silicone gel-forming composition described herein.

The table below demonstrates typical properties of various formulations materials. Other silicone products have also been tried, and have shown similar results.

For examples 1-8 listed in Table 1, organopolysiloxane (A) was mainly a vinyl silicone polymer of a viscosity about 40,000 centipoise as described above in Table (A), with optionally a small percentage (the weight percent relative to the total weight of vinyl polymers) of some low viscosity vinyl silicone polymer of about 500 centipoise, having a formula of $M^{vi}D_{160}D^{Vi}_5M^{Vi}$ or a vinyl silicone polymer having the formula $MD_{160}M^{Vi}$ and a viscosity of 400-700 centipoise with the 500 centipoise viscosity vinyl silicone polymer having a vinyl content of about 1.65 and the 400-700 centipoise vinyl silicone polymer having a vinyl content of 0.195. The relative amounts of each of these components is stated below in Table E. For examples 9 and 10 described in Table 1 organopolysiloxane (A) was also mainly a vinyl silicone polymer of a viscosity about 40,000 centipoise as described above in Table (A), with optionally a small percentage (the weight percent relative to the total weight of vinyl polymers) of some low viscosity vinyl silicone polymer having the formula $M^{Vi}D_{420}M^{Vi}$, and a viscosity of 4,000 cps and a vinyl content of 0.18% to about 0.20 can be used, such as in Examples 9 to 12 and as described in Table (A). Vi % as used in Table E is understood to be weight percent of vinyl groups based upon total weight of the specific organopolysiloxane described.

TABLE E

| Example | $M^{Vi}D_{160}D^{Vi}_5M^V$, viscosity 500 cps, Vi % 1.65%; | $MD_{160}M^{Vi}$ viscosity, 400 to 700 cps, Vi % 0.195% | $M^{Vi}D_{420}M^{Vi}$, viscosity 4,000 cps, Vi % 0.18%. |
|---|---|---|---|
| 1 | 3.50% | 8.60% | |
| 2 | 3.50% | 8.60% | |
| 3 | 4.80% | 5.70% | |
| 4 | 4.80% | 5.70% | |
| 5 | 4.80% | 5.70% | |
| 6 | 4.80% | 5.70% | |
| 7 | 4.80% | 5.70% | |
| 8 | 4.80% | 5.70% | |
| 9 | | | 21.50% |
| 10 | | | 21.50% |

Organohydrogenpolysiloxane (B) for, examples 1 through 8 was a combination of two silicone hydride polymers the first being a hydride resin with viscosity of about 10 to about 26 described in Table D and the other one being a linear hydride with a viscosity of about 50 centipoise and a hydride content of about 0.86 weight percent described in Table C; while examples 9 and 10 use a single hydride polymer with a viscosity of 30 centipoise and a hydride content of 0.74 as described in Table C.

The filler (C) for examples 1-8 was commercially available fumed silica of surface area of 300 m$^2$/g, which was treated, with both a cyclic siloxane octamethylcyclotetrasiloxane ($D_4$) and a vinyl silazane, which is hexamethyldisilazane (HMDZ). Examples 9 and 10 was commercially available fumed silica of surface area of 300 m$^2$/g and was treated with only vinyl silazane. Examples 11-13 was commercially available fumed silica treated with a silazane and a cyclic siloxane.

Catalyst (D), which was a zero-valenced platinum catalyst master batch in a vinyl silicone carrier and was for examples 1-8, xylene free Karstead's catalyst and for examples 9-13 was Ashby's catalyst.

Inhibitor (E) was the same for all examples listed here and was 1-ethynyl-1-cyclohexanol.

The four room temperature vulcanization (RTV) materials were typical gels included here as comparative examples.

Recovery times were all tested in the same manner as described above, which clearly showed that the comparative examples materials were far less hysteretic than the hysteretic silicone gel described herein. All weight in Table 1 below (unless indicated otherwise) were measured in parts by weight based on the 100 parts by weight of organopolysiloxane (A). It will be understood herein that parts by weight can be converted into weight percentage based on the total weight of curable hysteretic silicone gel-forming composition described herein by taking each component described herein and taking the ratio of sum total of the parts by weight of that component and dividing it by the sum of the total parts by weight of all of the components and multiplying this ratio by 100 to get the weight percentage of that component. Recovery time was measured in seconds and is given in approximate numbers of seconds. The penetration data was determined using the industry standard U-2A penetration test. For the following examples:

$M=R^{36}R^{37}R^{38}SiO_{1/2}$;
$M^H=R^{39}R^{40}HSiO_{1/2}$;
$M^{vi}=R^{41}R^{42}R^{43}SiO_{1/2}$;
$D=R^{44}R^{45}SiO_{2/2}$
$D^H=R^{46}HSiO_{2/2}$
$D^{vi}=R^{47}R^{48}SiO_{2/2}$;
$D(Ph)=R^{49}R^{50}SiO_{2/2}$
$T=R^{51}SiO_{3/2}$ $T^H = HSiO_{3/2}$;

$T^{vi} = R^{52}SiO_{3/2}$ and $Q = SiO_{2/2}$;

where $R^{36}$, $R^{37}$, $R^{38}$, $R^{44}$, $R^{45}$ and $R^{51}$ are independently monovalent hydrocarbon radicals having from one to sixty carbon atoms; $R^{39}$, $R^{40}$, and $R^{46}$ are independently monovalent hydrocarbon radicals having from one to sixty carbon atoms or hydrogen and are substantially free of aliphatic unsaturation; $R^{41}$ is a monovalent unsaturated hydrocarbon radical having from two to ten carbon atoms, and $R^{42}$ and $R^{43}$ are independently monovalent hydrocarbon radicals having from one to sixty carbon atoms; $R^{47}$ is a monovalent unsaturated hydrocarbon radical having from two to ten carbon atoms and $R^{48}$ is a monovalent hydrocarbon radical having from one to sixty carbon atoms; $R^{52}$ is a monovalent unsaturated hydrocarbon radical having from two to ten carbon atoms; $R^{49}$ and $R^{50}$ are independently monovalent hydrocarbon radicals having from one to sixty carbon atoms or phenyl, provided that at least one of $R^{49}$ or $R^{50}$ is phenyl.

TABLE 1

| Examples | A | B | C | D (ppm) | E | U-2A Penetration | Recovery Time (seconds) |
|---|---|---|---|---|---|---|---|
| 1 | 100 | 0.45 | 33 | 9.6 | 0.081 | 0.7 | 2 |
| 2 | 100 | 0.27 | 33 | 10.5 | 0.11 | 1.5 | 5 |
| 3 | 100 | 0.79 | 35 | 8 | 0.089 | 0.1 | 1 |
| 4 | 100 | 0.53 | 35 | 8.6 | 0.11 | 1 | 3 |
| 5 | 100 | 0.37 | 35 | 9 | 0.14 | 1.5 | 7 |
| 6 | 100 | 0.37 | 35 | 9 | 0.21 | 1.8 | 8 |
| 7 | 100 | 0.37 | 35 | 9 | 0.26 | 2.2 | 10 |
| 8 | 100 | 0.35 | 35 | 9.1 | 0.14 | 1.8 | 8 |
| 9 | 100 | 1.07 | 40 | 15 | 0.11 | 0.5 | 3 |
| 10 | 100 | 0.58 | 40 | 16.4 | 0.16 | 1 | 5 |
| RTV6126 | | | | | | | 0.25 sec |
| RTV6136 | | | | | | | 0.1 sec |
| RTV6196 | | | | | | | 0.1 sec |
| RTV6236 | | | | | | | <0.1 sec |

As described above, the above compositions are able to produce hysteretic (dead) gel with much longer recovery time than that of conventional gels, and also with desired softness. All these examples also passed other tests such as heat age, UV and incurred no leakage in a pen grip application trials.

The results of four specific formulations are listed here. For these formulations:

Example 11 had a mole ratio of total amount of silicon-bonded hydrogen atoms in (B) to one vinyl group in (A) of 0.76; and a recovery time of about 10 minutes without the skin material and about 1 minute with the conventional 40 Duro LIM skin material as housing. Example 12 had a mole ratio of total amount of silicon-bonded hydrogen atoms in (B) to one vinyl group in (A) of 0.61; and a recovery time of about 5 minutes without the skin material and about 20 seconds with the conventional 40 Duro LIM skin material as housing. Example 13 had a mole ratio of total amount of silicon-bonded hydrogen atoms in (B) to one vinyl group in (A) of 0.49; and a recovery time of about 7 minutes without the skin material and about 40 seconds with conventional 40 Duro LIM skin material as housing.

Example 11

| Description of Component | Weight Percent |
|---|---|
| $D_4$ + HMDZ treated Silica (200 m$^2$/g) | 21.175 |
| $M^{Vi}D_{800}M^{Vi}$; 40,000 cPs; weight percent vinyl is 0.08 | 67.745 |
| $M^{Vi}D_{420}M^{Vi}$; 4,000 cPs; weight percent vinyl is 0.18 | 10.585 |
| $M^H(D_{50})(D^H{}_{50})M^H$; 50 cPs; weight percent of H is about 0.86 | 0.345 |
| 1-ethynyl-1-cyclohexanol | 0.075 |
| Pt with zero valence (Pt(0)) in $D_4$ vinyl); Ashby's catalyst; weight percent of Pt 1.75 | 0.075 |
| Total | 100.000 |

Example 12

| Description of Component | Weight Percent |
|---|---|
| $D_4$ + HMDZ treated Silica (200 m$^2$/g) | 19.859 |
| $M^{Vi}D_{800}M^{Vi}$; 40,000 cPs; weight percent vinyl is 0.08 | 63.550 |
| $M^{Vi}D_{420}M^{Vi}$; 4,000 cPs; weight percent vinyl is 0.18 | 16.144 |
| $M^H(D_{50})(D^H{}_{50})M^H$; 50 cPs; weight percent of H is about 0.72 to about 1.0 | 0.296 |
| 1-ethynyl-1-cyclohexanol | 0.075 |
| Pt with zero valence (Pt(0)) in $D_4$ vinyl); Ashby's catalyst; weight percent of Pt 1.75 | 0.075 |

Example 13

| Description of Component | Weight Percent |
|---|---|
| $D_4$ + HMDZ treated Silica (200 m$^2$/g) | 13.78581 |
| $M^{Vi}D_{800}M^{Vi}$; 40,000 cPs; weight percent vinyl is 0.08 | 52.84562 |
| $M^{Vi}D_{160}M^{Vi}{}_5M^{Vi}$; 500 cPs; weight percent vinyl is 1.65 | 3.446454 |
| $MD_{160}M^{Vi}$; 550 cPs; weight percent of vinyl is 0.195; vinyl terminated at one end only | 18.38109 |
| $M^H{}_2Q$; 20 cPs; weight percent of hydride is 0.90; this is a hydride resin | 0.413574 |
| $M^{Vi}D_{105}D(Ph)_{11}M^{vi}$; 700 cPs; weight percent of vinyl is 0.53 and is phenyl vinyl | 11.02865 |
| 1-ethynyl-1-cyclohexanol | 0.064334 |
| Pt with zero valence (Pt(0)) in $D_4$ vinyl); Ashby's catalyst; weight percent of Pt is 1.75 | 0.034465 |

While the above description comprises many specifics, these specifics should not be construed as limitations, but merely as exemplifications of specific embodiments thereof. Those skilled in the art will envision many other embodiments within the scope and spirit of the description as defined by the claims appended hereto.

The invention claimed is:

1. A curable hysteretic silicone gel-forming composition comprising:

(A) at least one organopolysiloxane containing at least two silicon-bonded alkenyl groups per molecule;

(B) at least one organohydrogenpolysiloxane containing at least two silicon-bonded hydrogen atoms per molecule, said organohydrogenpolysiloxane (B) being used in an amount such that the mole ratio of total amount of silicon-bonded hydrogen atoms contained in organohydrogenpolysiloxane (B) to one silicon-bonded alkenyl group contained in organopolysiloxane (A) is of from about 0.20 to about 0.79;

(C) filler in an amount of from about 25 to about 100 parts per hundred of organopolysiloxane (A);

(D) catalyst; and, (E) inhibitor; wherein the recovery time of a hysteretic silicone gel obtained from said curable hysteretic silicone gel-forming composition is greater than about 3 seconds, where each organopolysiloxane (A) has the formula:

$$M_a M^{vi}_b D_c D^{vi}_d T_e T^{vi}_f Q_g$$

where
$M = R^7 R^8 R^9 SiO_{1/2}$;
$M^{vi} = R^{10} R^{11} R^{12} SiO_{1/2}$;
$D = R^{13} R^{14} SiO_{2/2}$;
$D^{vi} = R^{15} R^{16} SiO_{2/2}$;
$T = R^{17} SiO_{3/2}$;
$T^{vi} = R^{18} SiO_{3/2}$; and
$Q = SiO_{4/2}$;
where $R^7$, $R^8$, $R^9$, $R^{13}$, $R^{14}$ and $R^{17}$ are independently monovalent hydrocarbon radicals having from one to sixty carbon atoms; $R^{10}$ is a monovalent unsaturated hydrocarbon radical having from two to ten carbon atoms, and $R^{11}$ and $R^{12}$ are independently monovalent hydrocarbon radicals having from one to sixty carbon atoms; $R^{15}$ is a monovalent unsaturated hydrocarbon radical having from two to ten carbon atoms, and $R^{16}$ is a monovalent hydrocarbon radical having from one to sixty carbon atoms; $R^{17}$ is a monovalent unsaturated hydrocarbon radical having from two to ten carbon atoms; the stoichiometric subscripts a, b, c, d, e, f, and g are either zero or positive subject to the following limitations: c is greater than 10; d is from zero to about 40; when d=0, b=2; b is from zero to two provided that when b=0, d=2; b+d is of from 2 to about 40; when b=1, a=1; a+b≥2; e+f+g>0, and a+b+c+d≥e+f+g, and wherein said at least one organopolysiloxane (A) comprises a combination of (A-i) vinyl organopolysiloxane having a viscosity of from about 20,000 to about 60,000 centipoise at 25 degrees celsius, and (A-ii) vinyl organopolysiloxane having a viscosity of from about 250 to about 750 centipoise at 25 degrees celsius; organohydrogenpolysiloxane (B) is at least one organohydrogenpolysiloxane having terminal and/or non-terminal silicon-bonded hydrogen atoms and having a viscosity of from about 15 to about 60 centipoise at 25 degrees celsius.

2. The curable hysteretic silicone gel-forming composition of claim 1 further comprising a non-alkenyl containing polyorganosiloxane selected from the group consisting of linear polyorganosiloxane, a non-network branched polyorganosiloxane, three-dimensional network polyorganosiloxane, non-network resinous polyorganosiloxane and combinations thereof where each polyorganosiloxane does not contain any alkenyl groups.

3. The curable hysteretic silicone gel-forming composition of claim 1 where at least two silicon-bonded alkenyl groups contain from 2 to about 6 carbon atoms.

4. The curable hysteretic silicone gel-forming composition of claim 1 where organo groups of organopolysiloxane (A) comprise methyl and/or phenyl.

5. The curable hysteretic silicone gel-forming composition of claim 1 which further comprises non-hydrogen containing organopolysiloxane selected from the group consisting of linear organopolysiloxane, non-network branched organopolysiloxane, cyclic organopolysiloxane, three-dimensional network organopolysiloxane, non-network resinous organopolysiloxane and combinations thereof where each organopolysiloxane does not contain any silicon-bonded hydrogen atoms.

6. The curable hysteretic silicone gel-forming composition of claim 1 where organohydrogenpolysiloxane (B) is substantially resinous organohydrogenpolysiloxane and comprises no less than about 30 weight percent of T and/or Q units, where $T = R^{24} SiO_{3/2}$ and $Q = SiO_{4/2}$, where $R^{24}$ is selected from the group consisting of a monovalent hydrocarbon radical of from one to about sixty carbon atoms; a hydrogen atom; and combinations thereof.

7. The curable hysteretic silicone gel-forming composition of claim 1 where organohydrogenpolysiloxane (B) has the formula:

$$M_h M^H_i D_j D^H_k T_L T^H_m Q_n$$

where
$M = R^{27} R^{28} R^{29} SiO_{1/2}$;
$M^H = R^{30} R^{31} HSiO_{1/2}$;
$D = R^{32} R^{33} SiO_{2/2}$;
$D^H = R^{34} HSiO_{2/2}$;
$T = R^{35} SiO_{3/2}$;
$T^H = HSiO_{3/2}$; and
$Q = SiO_{4/2}$;
where $R^{27}$, $R^{28}$, $R^{29}$, $R^{32}$, $R^{33}$, and $R^{35}$ are independently monovalent hydrocarbon radicals having from one to sixty carbon atoms and are substantially free of aliphatic unsaturation; $R^{30}$, $R^{31}$, and $R^{34}$ are independently monovalent hydrocarbon radicals having from one to sixty carbon atoms or hydrogen and are substantially free of aliphatic unsaturation the stoichiometric subscripts h, i, j, k, L, m and n being zero or positive subject to the following limitations: J is greater than 0; k is of from zero to about 20, when k=0, i=2; h is of from zero to about 2; subject to the further limitation that i+k is of from 2 to about 20, when i=1, h=1; h+i≥2; and in at least one substantially straight chain organohydrogenpolysiloxane if L+m+n>0 then h+i+j+k>L+m+n; and organohydrogenpolysiloxane (B) contains at least two silicon-bonded hydrogen atoms per molecule.

8. The curable hysteretic silicone gel-forming composition of claim 1 where each organohydrogenpolysiloxane (B) has a viscosity of from about 0.1 to about 2000 centipoise at 25 degrees celsius.

9. The curable hysteretic silicone gel-forming composition of claim 1 where each organohydrogenpolysiloxane (B) has a viscosity of from about 0.5 to about 1000 centipoises at 25 degrees celsius.

10. The curable hysteretic silicone gel-forming composition of claim 1 where each organohydrogenpolysiloxane (B) has a viscosity of from about 1 to about 500 centipoise at 25 degrees celsius.

11. The curable hysteretic silicone gel-forming composition of claim 1 where the mole ratio of total amount of silicon-bonded hydrogen atoms contained in organohydrogenpolysiloxane (B) to one silicon-bonded alkenyl group contained in organopolysiloxane (A) is of from about 0.25 to about 0.75.

12. The curable hysteretic silicone gel-forming composition of claim 1 where the mole ratio of total amount of silicon-bonded hydrogen atoms contained in organohydrogenpolysiloxane (B) to one silicon-bonded alkenyl group contained in organopolysiloxane (A) is of from about 0.30 to about 0.65.

13. The curable hysteretic silicone gel-forming composition of claim 1 where filler (C) is present in an amount of from about 35 to about 80 parts by weight per 100 parts of organopolysiloxane (A).

14. The curable hysteretic silicone gel-forming composition of claim 1 where filler (C) is present in an amount of from about 40 to about 65 parts by weight per 100 parts of organopolysiloxane (A).

15. The curable hysteretic silicone gel-forming composition of claim 1 where filler is selected from the group consisting of silica, fumed silica, precipitated silica, titania, alumina, clay, wollastonite, quartz and combinations thereof.

16. The curable hysteretic silicone gel-forming composition of claim 1 where catalyst (D) is at least one Group VIIIB catalyst.

17. The curable hysteretic silicone gel-forming composition of claim 1 where inhibitor (E) has aliphatic=saturation and is selected from the group consisting of diallyl maleate, D-4 vinyl, 2-methyl-3-butene-2-ol, 1-ethynyl-1-cyclohexanol, 3,5,-dimethyl-1-hexyn-3-ol and combinations thereof.

18. A hysteretic silicone gel obtained from the curing of curable hysteretic silicone gel-forming composition of claim 1.

19. The hysteretic gel of claim 18 having a recovery time of specifically greater than about 3 seconds.

20. A hand-grippable device having an external surface at least a portion of which comprises hysteretic silicone gel of claim 19.

21. The hand-grippable device of claim 20 which is a writing implement, a razor, a toothbrush, a utensil, sport equipment, a tool, a motor-driven device, or a steering wheel.

22. A curable hysteretic silicone gel-forming composition comprising:
(A) at least one organopolysiloxane containing at least two silicon-bonded alkenyl groups per molecule;
(B) at least one organohydrogenpolysiloxane containing at least two silicon-bonded hydrogen atoms per molecule, said organohydrogenpolysiloxane (B) being used in an amount such that the mole ratio of total amount of silicon-bonded hydrogen atoms contained in organohydrogenpolysiloxane (B) to one silicon-bonded alkenyl group contained in organopolysiloxane (A) is of from about 0.20 to about 0.79;
(C) filler in an amount of from about 25 to about 100 parts per hundred of organopolysiloxane (A);
(D) catalyst; and,
(E) inhibitor; wherein the recovery time of a hysteretic silicone gel obtained from said curable hysteretic silicone gel-forming composition is greater than about 3 seconds,
where organopolysiloxane (A) is a combination of (A-i) vinyl organopolysiloxane having a viscosity of from about 20,000 to about 60,000 centipoise at 25 degrees celsius, being present in an amount of from about 60 to about 75 weight percent, and (A-ii) vinyl organopolysiloxane having a viscosity of from about 250 to about 750 centipoise at 25 degrees celsius being present in an amount of from about 5 to 15 about weight percent; organohydrogenpolysiloxane (B) is at least one organohydrogenpolysiloxane having terminal and/or non-terminal silicon-bonded hydrogen atoms and having a viscosity of from about 15 to about 60 centipoise at 25 degrees celsius, being present in an amount of from about 0.2 to about 0.5 weight percent; filler (C) being fumed silica with a surface area of from about 200 to about 350 m$^2$/g, said fumed silica having been treated with silane, where filler (C) is present in an amount of from about 15 to about 25 weight percent; catalyst (D) is a platinum catalyst where catalyst (D) is present in an amount of from about 10 to about 20 parts per million; and, inhibitor (E) is 1-ethynyl-1-cyclohexanol where inhibitor (E) is present in an amount of from about 0.05 to about 0.1 weight percent, with all weight percents being based upon the total weight of the curable hysteretic silicone gel-forming composition.

23. A curable hysteretic silicone gel-forming composition comprising:
(A) at least one organopolysiloxane containing at least two silicon-bonded alkenyl groups per molecule;
(B) at least one organohydrogenpolysiloxane containing at least two silicon-bonded hydrogen atoms per molecule, said organohydrogenpolysiloxane (B) being used in an amount such that the mole ratio of total amount of silicon-bonded hydrogen atoms contained in organohydrogenpolysiloxane (B) to one silicon-bonded alkenyl group contained in organopolysiloxane (A) is of from about 0.20 to about 0.79;
(C) filler in an amount of from about 25 to about 100 parts per hundred of organopolysiloxane (A);
(D) catalyst; and,
(E) inhibitor; wherein the recovery time of a hysteretic silicone gel obtained from said curable hysteretic silicone gel-forming composition is greater than about 3 seconds,
where organopolysiloxane (A) is a combination of (A-i) vinyl organopolysiloxane having a viscosity of from about 20,000 to about 60,000 centipoise at 25 degrees celsius, and (A-ii) vinyl organopolysiloxane having a viscosity of from about 250 to about 750 centipoise at 25 degrees celsius; organohydrogenpolysiloxane (B) is at least one organohydrogenpolysiloxane having terminal and/or non-terminal silicon-bonded hydrogen atoms and having a viscosity of from about 15 to about 60 centipoise at 25 degrees celsius.

* * * * *